United States Patent
Yoshino (10) Patent No.: US 12,523,677 B2
(45) Date of Patent: Jan. 13, 2026

(54) LEVEL DIFFERENCE MEASURING APPARATUS AND METHOD OF CALCULATING LEVEL DIFFERENCE

(71) Applicant: Kioxia Corporation, Tokyo (JP)

(72) Inventor: Kiminori Yoshino, Kuwana Mie (JP)

(73) Assignee: KIOXIA CORPORATION, Tokyo (JP)

( * ) Notice: Subject to any disclaimer, the term of this patent is extended or adjusted under 35 U.S.C. 154(b) by 343 days.

(21) Appl. No.: 18/447,431

(22) Filed: Aug. 10, 2023

(65) Prior Publication Data
US 2024/0061014 A1 Feb. 22, 2024

(30) Foreign Application Priority Data
Aug. 19, 2022 (JP) .................. 2022-131145

(51) Int. Cl.
*G01Q 60/24* (2010.01)
(52) U.S. Cl.
CPC .................... *G01Q 60/24* (2013.01)
(58) Field of Classification Search
CPC .................................................. G01Q 60/24
See application file for complete search history.

(56) References Cited

U.S. PATENT DOCUMENTS

| 9,103,784 B1* | 8/2015 | Sivasankar | G02B 21/0076 |
| 2013/0146221 A1* | 6/2013 | Kolmakov | H01J 37/20 156/252 |
| 2022/0067898 A1* | 3/2022 | Chen | G01N 21/8851 |

FOREIGN PATENT DOCUMENTS

JP 2010-118487 A 5/2010

* cited by examiner

*Primary Examiner* — Nicole M Ippolito
(74) *Attorney, Agent, or Firm* — Foley & Lardner LLP (57) ABSTRACT

A level difference measuring apparatus that measures a level difference on a specimen surface having unevenness formed thereon includes: an atomic force microscope configured to measure a surface height of each of a plurality of measurement points set on the specimen surface; and a level difference calculation unit configured to calculate the level difference in a measurement target area including the plurality of measurement points. The level difference calculation unit sets a measurement area including at least one level difference portion in the measurement target area, generates a histogram by histogramming the surface heights of the measurement points provided in the measurement area, and calculates, based on the histogram, the level difference of the level difference portion provided in the measurement area.

14 Claims, 9 Drawing Sheets

FIG. 15 a level difference measuring apparatus and a method of calculating a level difference capable of easily measuring a level difference to be measured and reducing measurement variations.
LEVEL DIFFERENCE MEASURING APPARATUS AND METHOD OF CALCULATING LEVEL DIFFERENCE

CROSS-REFERENCE TO RELATED APPLICATION(S)

This application is based upon and claims the benefit of priority from Japanese Patent Application No. 2022-131145, filed Aug. 19, 2022, the entire contents of which are incorporated herein by reference.

FIELD

Embodiments described herein relate generally to a level difference measuring apparatus and a method of calculating a level difference.

BACKGROUND

An atomic force microscope (AFM) is known as an apparatus for measuring a level difference formed on a semiconductor substrate or the like with high accuracy.

DETAILED DESCRIPTION

Embodiments provide a level difference measuring apparatus and a method of calculating a level difference capable of easily measuring a level difference to be measured and reducing measurement variations.

In general, according to at least one embodiment, a level difference measuring apparatus that measures a level difference on a specimen surface having unevenness formed thereon includes: a height measurement mechanism configured to measure a surface height of each of a plurality of measurement points set on the specimen surface; and a level difference calculation unit (level difference calculator) configured to calculate the level difference in a measurement target area including the plurality of measurement points. The level difference calculation unit sets a measurement area including at least one level difference portion in the measurement target area, generates a first histogram by histogramming the surface heights of the measurement points provided in the measurement area, and calculates, based on the first histogram, the level difference of the level difference portion provided in the measurement area.

Hereinafter, embodiments will be described with reference to the drawings.

Figure 1:
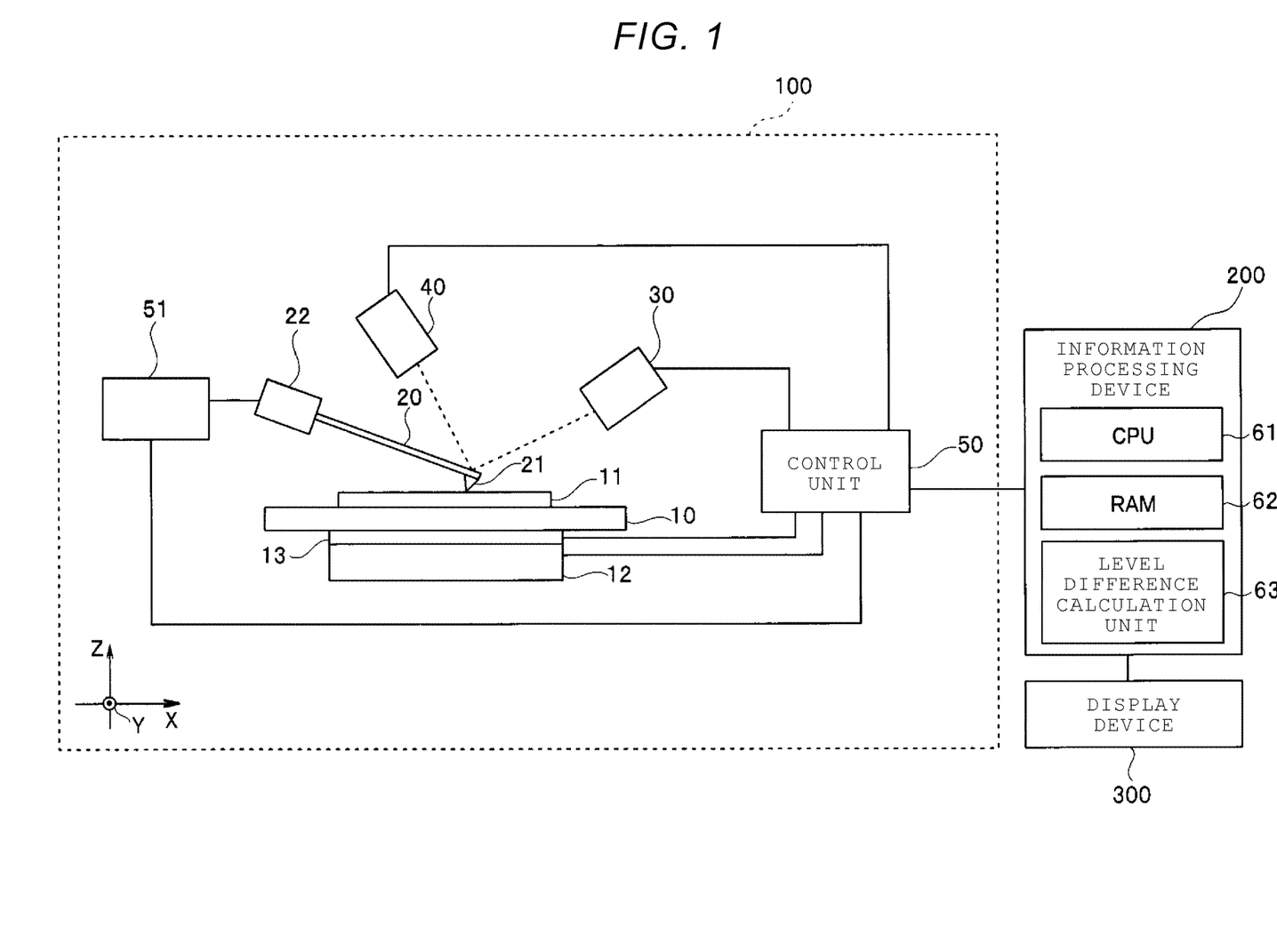
FIG. 1 is a block diagram illustrating a configuration example of a level difference measuring apparatus according to at least one embodiment of the present disclosure.

FIG. 1 is a block diagram illustrating a configuration example of a level difference measuring apparatus according to a first embodiment of the present disclosure. The level difference measuring apparatus of at least one embodiment includes an atomic force microscope (also referred to as an AFM) 100 and an information processing device 200, and the same is used to measure a level difference on the surface of a semiconductor device (for example, an electric circuit formed on a silicon wafer), which is a specimen 11. In addition, the level difference measuring apparatus may further include a display device 300 configured to display information on the measured level difference, data obtained during measurement, and the like.

The atomic force microscope 100 serving as a height measurement mechanism is a type of microscope that detects atomic force acting on a probe 21 and the specimen 11, and the same includes a specimen stage 10, a cantilever 20, a laser unit 30, a detection unit 40, and a control unit 50.

The specimen 11 is placed on the surface of the specimen stage 10 during measurement. The specimen stage 10 is movable in two orthogonal directions parallel to the surface of the specimen stage 10 (x direction and y direction) by a horizontal driving unit 12. By moving the specimen stage 10 in the x direction and/or the y direction, a measurement target area OA of the specimen 11 can be moved. In addition, the specimen stage 10 is movable in a direction perpendicular to the surface of the specimen stage 10 (z direction) by a vertical driving unit 13.

The elongated plate-shaped cantilever 20 has the probe 21 attached to a surface of one end thereof, the surface facing the specimen 11. The probe 21 is a fine needle-like member. Further, the cantilever 20 has the other end of the cantilever 20 connected to an attachment unit 22. The attachment unit 22 is movable in two orthogonal directions parallel to the surface of the specimen stage 10 (x direction and y direction) by a driving unit 51. By moving the cantilever 20 in the x direction and/or the y direction, a measurement point in the measurement target area OA can be moved. More specifically, in the measurement target area OA of the specimen 11, after the position of the probe 21 in the Y direction is fixed and moved from one end to the other end in the X direction, the position of the probe 21 in the Y direction is changed and is moved from the other end to the one end in the X direction. In this manner, the above-described operation is repeatedly performed. Then, when this operation is repeatedly performed to complete the movement from one end to the other end in the Y direction, one scan is completed. Then, after the position of the probe 21 is returned to the positions of the one end in the X direction and the one end in the Y direction, the above-described operation from the one end to the other end in the Y direction is performed, thereby performing the next scan.

When a level difference is measured, the cantilever 20 is selected in consideration of a material of the specimen 11, the required resolution, and the like, among various cantilevers having different shapes such as different length and thickness, different materials, and the like. Thereafter, the selected cantilever 20 is attached to the attachment unit 22 to be used.

The laser unit 30 irradiates the cantilever 20 with a semiconductor laser. The detection unit 40 detects displacement of the cantilever 20. That is, the semiconductor laser emitted from the laser unit 30 is reflected by the cantilever 20. The detection unit 40 detects the reflected semiconductor laser. More specifically, the detection unit 40 detects an incident position of the laser beam reflected near the movable end of the cantilever 20 (one end to which the probe 21 is attached), and a deflection amount of the cantilever 20 is measured by the incident position.

The control unit 50 receives a signal from the detection unit 40 while scanning the surface of the specimen 11 with the probe 21, and detects the displacement amount of the cantilever 20 based on the signal. Then, based on the detected value of this displacement amount, the vertical driving unit 13 is controlled to adjust the position of the specimen stage 10 in the Z direction so that this displacement amount becomes a constant value.

In the above description, the cantilever 20 is moved during scanning in the X and Y directions. Alternatively, the cantilever 20 may be fixed and the specimen stage 10 may be moved by the horizontal driving unit 12, or both the cantilever 20 and the specimen stage 10 may be moved. Further, in the above description, the position adjustment in the Z direction is performed by moving the specimen stage 10 using the vertical driving unit 13. Alternatively, the driving unit 51 may move the cantilever 20 in the Z direction.

The information processing device 200 is, for example, a computer, and includes a central processing unit (CPU) 61, a RAM 62, and a level difference calculation unit 63. The information processing device 200 generates data representing the surface shape of the specimen 11 based on the data input from the atomic force microscope 100 (the displacement amount of the cantilever 20 based on the signal from the detection unit 40, the position information of the probe 21). Further, a level difference to be managed is calculated based on the generated data.

The CPU 61 operates according to a program stored in a memory (not illustrated) and controls each unit of the information processing device 200. The RAM 62 stores the data input from the atomic force microscope 100 and stores a detection result of the level difference calculation unit 63.

The level difference calculation unit 63 calculates the level difference to be managed in the measurement target area OA based on the data input from the atomic force microscope 100. It should be noted that the operation in the level difference calculation unit 63 may be stored as a program in advance in a memory (not illustrated), and the CPU 61 may execute the program to perform level difference calculation by software. Further, the information processing device 200 may be integrated with the control unit 50 as a part of the atomic force microscope 100, and may have a function of not only generating surface shape data and calculating a level difference to be managed, but also controlling the atomic force microscope 100, such as controlling the position adjustment of the specimen stage 10 and the cantilever 20.

Figure 2:
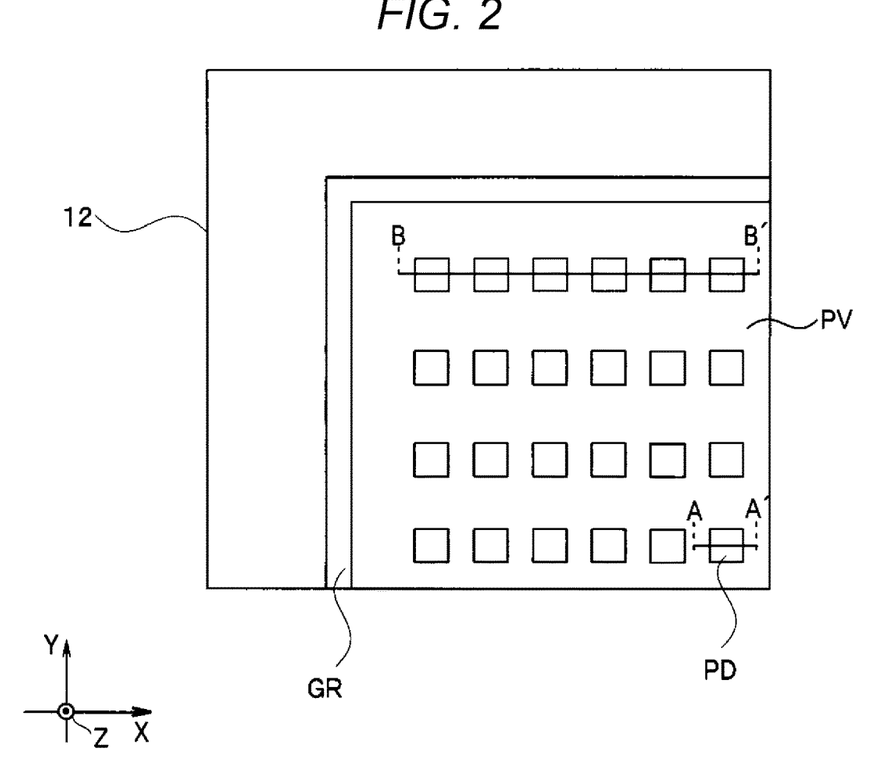
FIG. 2 is a top view illustrating an example of an inspection target area in a specimen.
Figure 3A:
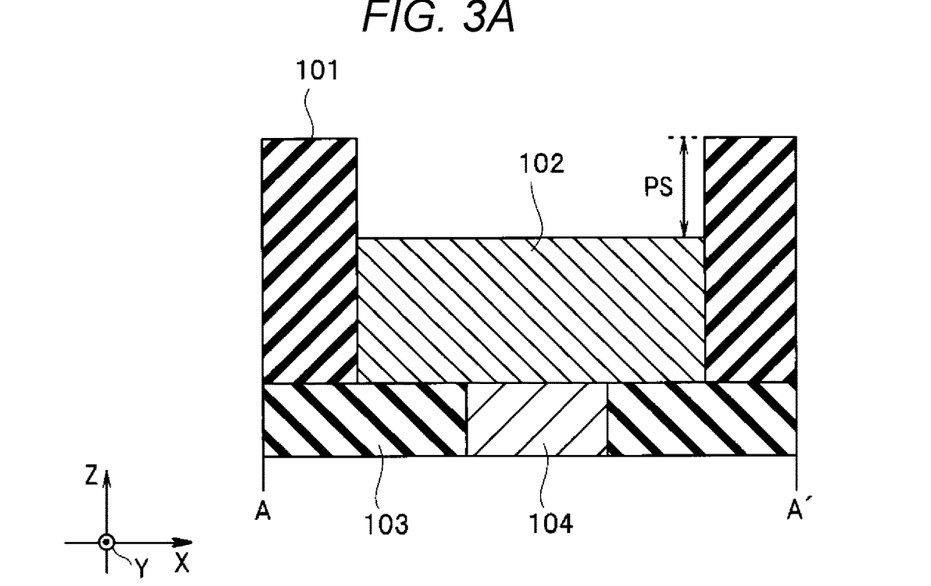
FIG. 3A is a vertical cross-sectional view taken along the line A-A' in FIG. 2.

Next, a method of calculating a level difference in at least one embodiment will be described. First, an example of a level difference to be managed will be described with reference to FIGS. 2 and 3. FIG. 2 is a top view illustrating an example of an inspection target area in a specimen. FIG. 3A is a vertical cross-sectional view taken along the line A-A' in FIG. 2.

As illustrated in FIG. 2, the measurement target area OA is, for example, the upper surface of a semiconductor chip on which a semiconductor device (for example, an electric circuit and the like formed on a silicon wafer) is formed, and is set in the vicinity of the chip end. A passivation film PV is formed on the measurement target area OA. Further, a guard ring area GR and a plurality of pads PD are exposed from the passivation film PV.

As illustrated in FIG. 3A, an insulating film 101 is formed as the passivation film PV on the surface of the measurement target area OA. An opening is formed in a part of the insulating film 101, and a conductive film 102 made of metal (for example, copper) is formed in the opening. The conductive film 102 functions as the pad PD. An interlayer insulating film 103 is formed below the insulating film 101 and the conductive film 102. The interlayer insulating film 103 has an opening formed in a part of the lower area of the conductive film 102, and a contact plug 104 made of a conductive material is embedded in the opening. That is, the conductive film 102 is electrically connected to the contact plug 104. The contact plug 104 is electrically connected to an electric circuit (not illustrated) formed under a wiring via the wiring (not illustrated) formed under the interlayer insulating film 103. With such a configuration, a predetermined voltage is supplied to the electric circuit forming the semiconductor device by supplying power to the pad PD from the outside.

The surface of the conductive film 102 is formed at a position lower than that of the surface of the insulating film 101. That is, there is a height difference between the surface of the pad PD and the surface of the passivation film PV, thereby forming a level difference PS. The level difference PS between the passivation film PV (insulating film 101) and the pad PD (conductive film 102) is calculated, for example, as a management target.

Figure 3B:
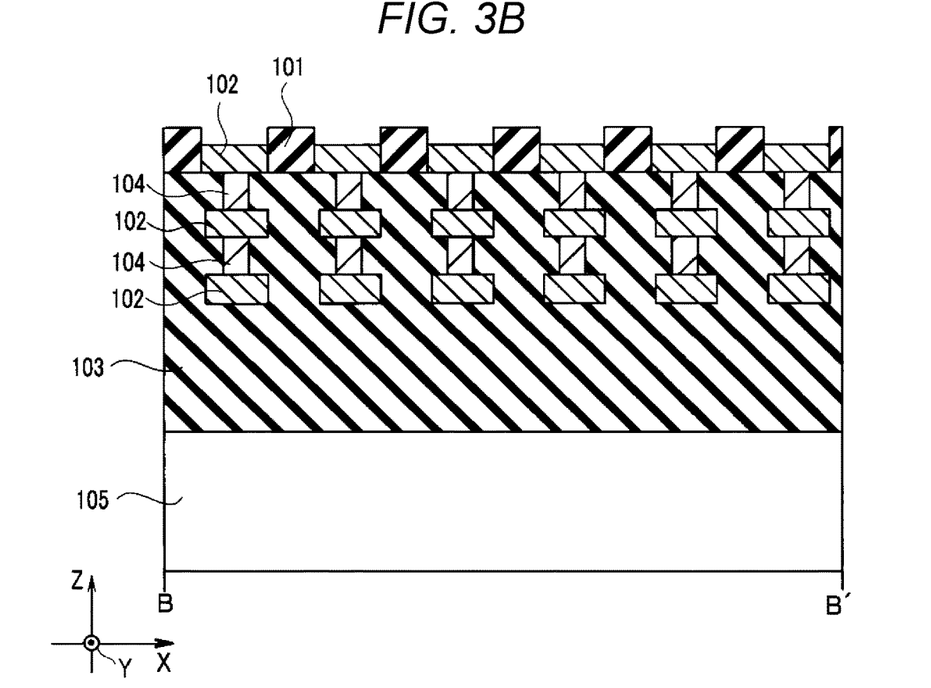
FIG. 3B is a vertical cross-sectional view taken along the line B-B' in FIG. 2.
Figure 3C:
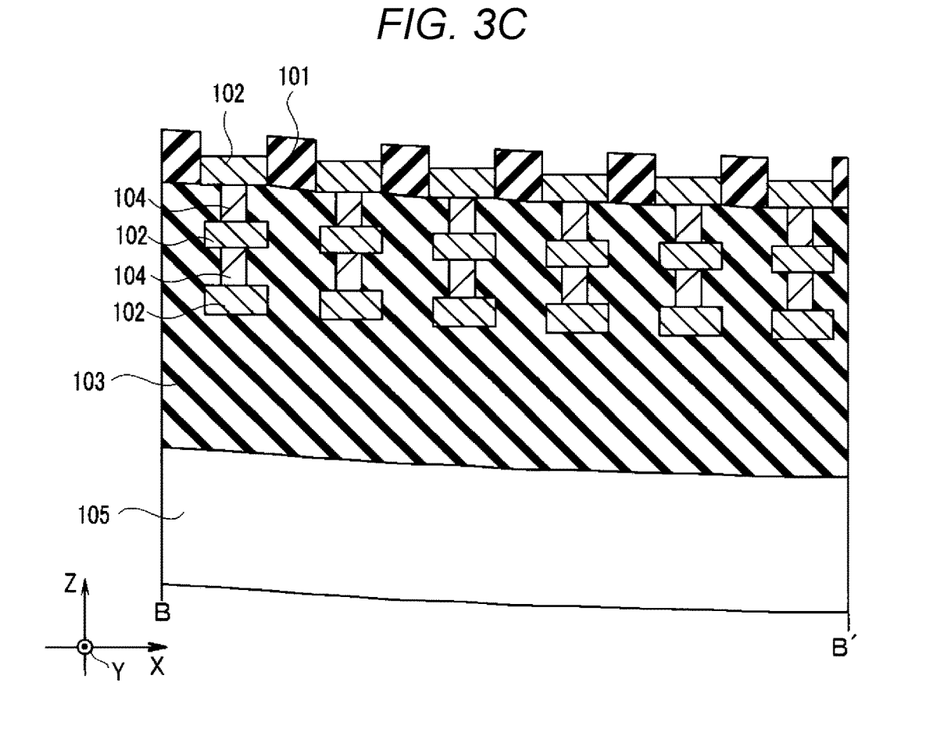
FIG. 3C is a vertical cross-sectional view taken along the line B-B' in FIG. 2.
Figure 4:
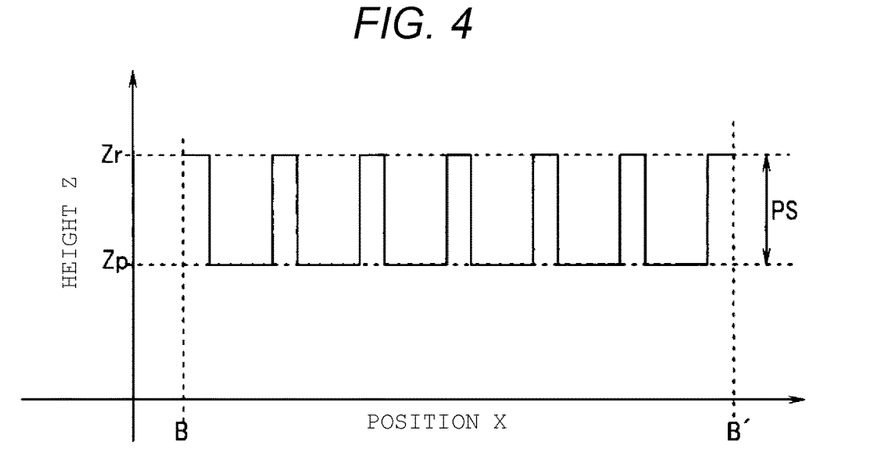
FIG. 4 is a diagram illustrating an example of a measurement result of the inspection target area taken along the line B-B' in FIG. 2.

FIGS. 3B and 3C are vertical cross-sectional views taken along the line B-B' in FIG. 2. FIGS. 3B and 3C illustrate a vertical cross section from a semiconductor substrate 105 to the insulating film 101. In the semiconductor device shown in FIG. 3B, the surface height of the passivation film PV is all the same in the measurement target area OA, and the height of the pad PD is all the same in the measurement target area OA. Further, FIG. 3B is a cross-sectional view illustrating a state in which the specimen 11 is not warped or distorted. FIG. 4 is a diagram illustrating an example of a measurement result of the inspection target area taken along the line B-B' in FIG. 2. FIG. 4 illustrates a measurement result in the state illustrated in FIG. 3B (the specimen 11 is in an ideal state). In the case of the ideal state, the measurement result obtained while scanning is performed using the probe 21 along the line B-B' in FIG. 2 is that a measurement value of the passivation film PV is defined as Zr, and a measurement value of the pad PD is defined as Zp. Therefore, the level difference PS between the passivation film PV and the pad PD is calculated by (Zr−Zp).

Meanwhile, in the manufacturing process of the semiconductor device, the specimen 11 may be warped or distorted due to stress or the like applied by film formation. Further, when the specimen 11 is placed on the specimen stage 10, the surface of the specimen stage 10 and the back surface of the specimen 11 are not in parallel, which may cause a placement failure in which the specimen 11 is placed with an inclination relative to the specimen stage 10. When such a placement failure occurs, an in-plane error may occur in the measurement value by the amount of inclination. FIG. 3C is a cross-sectional view illustrating a state in which the specimen 11 is warped or distorted as described above. Therefore, consequently, a measurement result as illustrated in FIG. 5B is obtained.

Figure 5A:
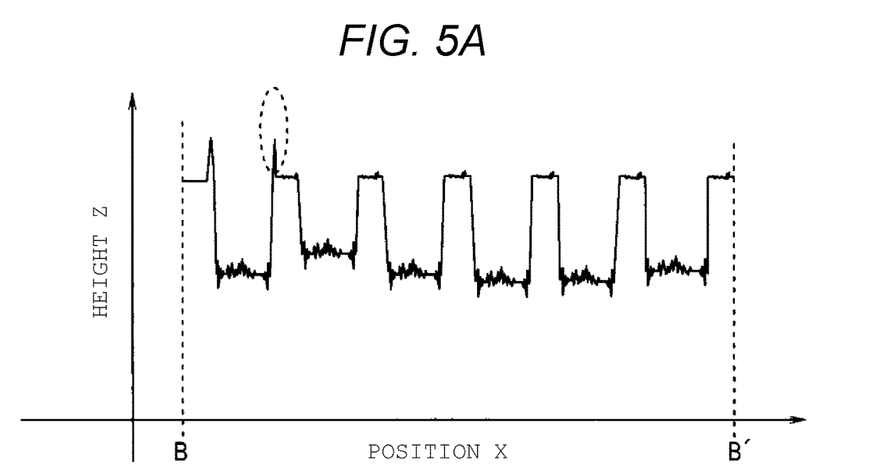
FIG. 5A is a diagram illustrating another example of the measurement result of the inspection target area taken along the line B-B' in FIG. 2.
Figure 5B:
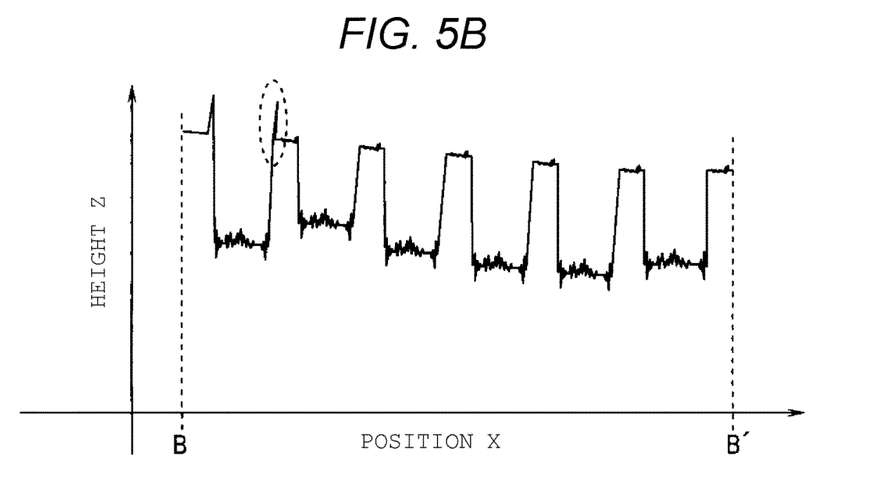
FIG. 5B is a diagram illustrating another example of the measurement result of the inspection target area taken along the line B-B' in FIG. 2.

FIGS. 5A and 5B are diagrams illustrating another example of the measurement result of the inspection target area taken along the line B-B' in FIG. 2. FIG. 5B illustrates an example of a measurement result when, as illustrated in FIG. 3C, the specimen 11 is placed on the positive side in the X direction with a downward inclination to the right, and the specimen 11 is distorted so that the positive side thereof in the X direction becomes convex. As illustrated in FIG. 5B, the height of the surface of the passivation film PV varies depending on the position (X coordinate) and does not have a constant value. Additionally, the height of the pad PD varies depending on the position (X coordinate) and does not have a constant value. In order to eliminate these factors from the measurement result, for example, in the measurement target area OA of the specimen 11, the measurement result is corrected by using a measurement value of the height Z of an area in which the surface is flat without forming a level difference thereon. However, when an area in which a level difference is not formed and the surface is flat does not exist in the measurement target area OA, such correction cannot be performed.

Additionally, even in a state where the specimen 11 is not warped or distorted, as illustrated in FIG. 5A, due to influence of a chemical mechanical polishing (CMP) process, the passivation film PV (the insulating film 101) may have a partially (locally) protruding height (areas indicated by dotted ellipses in FIGS. 5A and 5B), or due to in-plane variations in the film thickness of the pad PD (the conductive film 102), the height of the pad PD may vary depending on the position, which causes a level difference. Due to these influences, it is difficult to uniquely calculate the height of the passivation film PV and the height of the pad PD from the measurement result.

Figure 6:
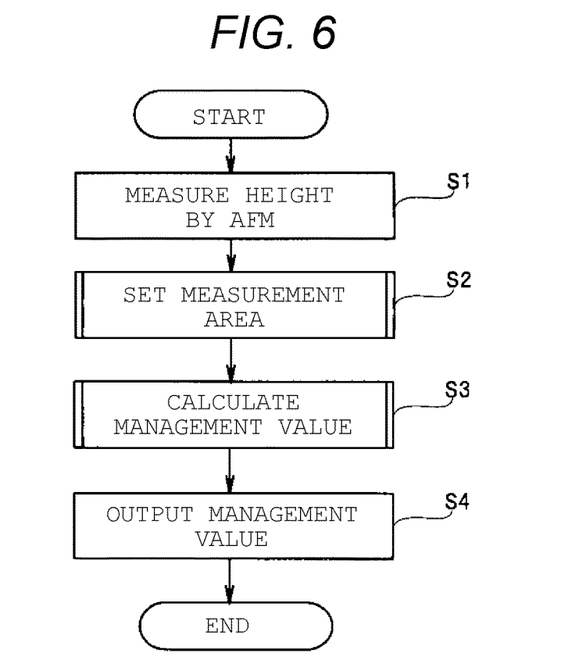
FIG. 6 is a flowchart illustrating an example of a procedure of a method of calculating a level difference according to at least one embodiment of the present disclosure.

FIG. 6 is a flowchart illustrating an example of a procedure of a method of calculating a level difference according to the embodiment of the present disclosure. By executing the procedure illustrated in FIG. 6, it is possible to reduce measurement variations and easily calculate a level difference to be managed.

First, the AFM 100 measures a height of the surface of all the measurement points in the measurement target area OA (S1). Next, a measurement area MA is set (S2). The measurement area MA is a partial area in the measurement target area OA, and is an area having a specified range to be used as a measurement value for calculating a level difference.

Figure 7A:
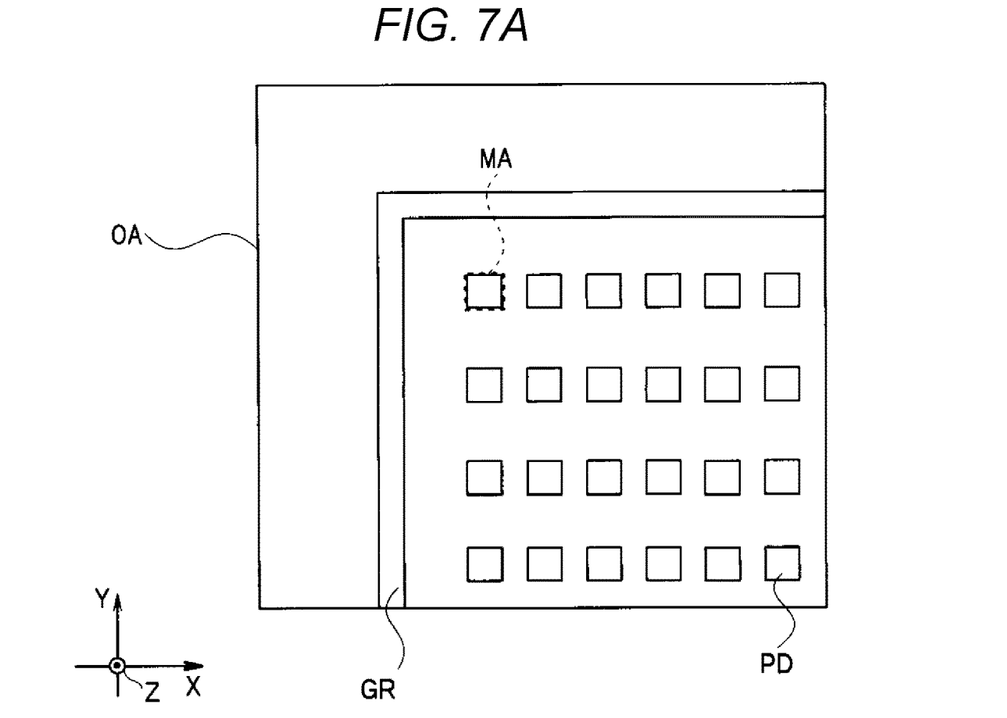
FIG. 7A is a top view illustrating an example of a measurement area.
Figure 7B:
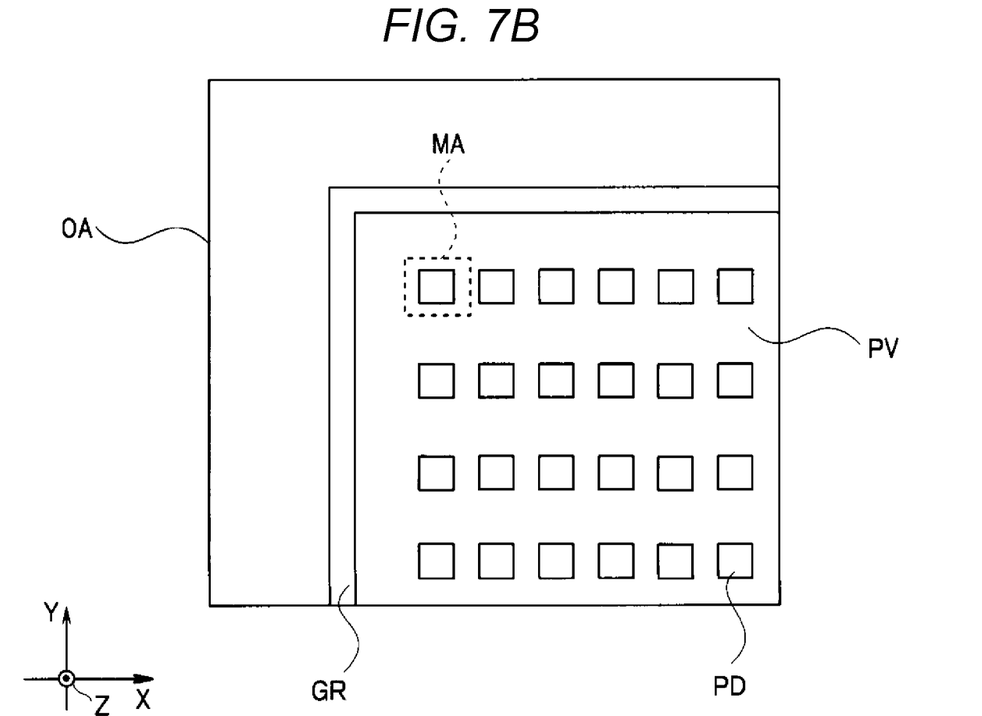
FIG. 7B is a top view illustrating an example of the measurement area.

FIGS. 7A and 7B are top views illustrating an example of the measurement area. When a management target is the level difference PS between the passivation film PV (the insulating film 101) and the pad PD (the conductive film 102), for example, as illustrated in FIG. 7B, an area including one pad PD and the passivation film PV formed around the pad PD (four sides outside the pad PD) is set as the measurement area MA.

Figure 8:
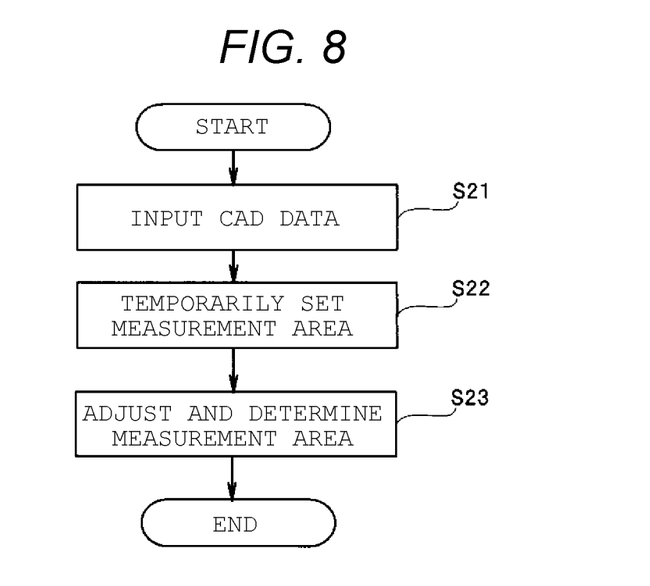
FIG. 8 is a flowchart illustrating an example of a setting procedure of the measurement area.

The setting of the measurement area MA (S2) is performed, for example, according to a procedure illustrated in FIG. 8. FIG. 8 is a flowchart illustrating an example of a measurement area setting procedure. First, computer aided design (CAD) data, which is layout data for each part of a semiconductor device, is input to the information processing device 200 (S21). Next, based on the CAD data, an area of the pad PD to be measured for the level difference is set, and the measurement area is temporarily set (S22). For example, as illustrated in FIG. 7B, in the case of calculating a level difference of a pad PD located at the upper left corner among the plurality of pads PD located in a grid pattern, first, positional information of the pad PD (layout data of the pad) is extracted from the CAD data, and the positional information is temporarily set as the measurement area MA, as illustrated in FIG. 7A. Finally, the measurement area temporarily set in S22 is adjusted to determine the measurement area MA, as illustrated in FIG. 7B (S23). The temporarily set measurement area includes only the pad PD and does not include the surrounding passivation film PV. Therefore, for example, the temporarily set measurement area is adjusted (enlarged) to determine the measurement area MA, which is a level difference calculation range, so that the passivation film PV between four outer sides of the pad PD and four portions of the passivation film PV, the four portions being located away from the four outer sides by a predetermined distance, is provided in the measurement area MA. A plurality of measurement areas MA may be set in the measurement target area OA. For example, in the case of calculating a level difference for each of the 24 pads PD illustrated in FIGS. 7A and 7B, 24 measurement areas MA are set in S2.

Figure 9:
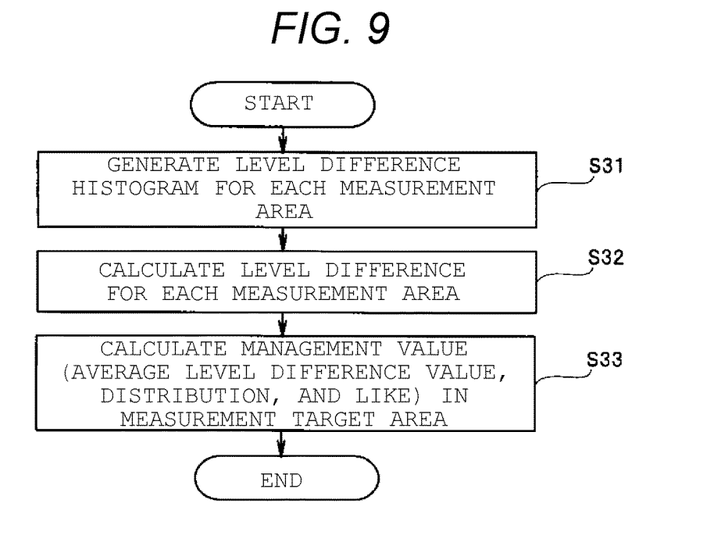
FIG. 9 is a flowchart illustrating an example of a calculation procedure of a management value.
Figure 10:
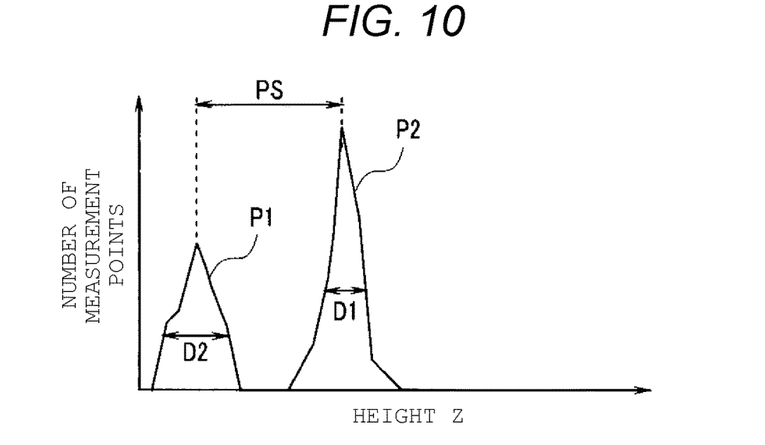
FIG. 10 is a diagram illustrating an example of a level difference histogram.

Subsequently, a management value (level difference) is calculated for the measurement area MA set in S2 (S3). Management value calculation (S3) is performed, for example, by a procedure illustrated in FIG. 9. FIG. 9 is a flowchart illustrating an example of a management value calculation procedure. First, a level difference histogram is generated for each measurement area MA (S31). FIG. 10 is a diagram illustrating an example of the level difference histogram. The level difference histogram is a histogram representing a height distribution with respect to measurement data of a measurement point existing in the measurement area MA.

As illustrated in FIG. 10, two distribution peaks are formed in the level difference histogram. A first peak P1 appearing on the lower height side is formed of measurement data of a measurement point existing in an area where the pad PD is formed. A second peak P2 appearing on the higher height side is formed of measurement data of a measurement point existing in an area where the passivation film PV is formed.

Next, the level difference PS is calculated from the generated level difference histogram for each measurement area MA (S32). The level difference PS between the passivation film PV and the pad PD is calculated from a difference between the height of the second peak P2 and the height of the first peak P1. By representing a measurement result as a level difference histogram in this way, even if there is a variation in a measurement value of the measurement point in the pad PD or a variation in a measurement value of the measurement point in the passivation film PV, the level difference PS can be calculated by a simple method while reducing the influence of the measurement variation. Furthermore, the range of measurement points adopted for the level difference histogram is limited to the measurement area MA, thereby making it possible to, in calculating the level difference PS, eliminate the influence of an inclination when the specimen 11 is placed on the specimen stage 10 and an overall (global) height deviation such as warpage and distortion of the specimen 11.

Figure 11:
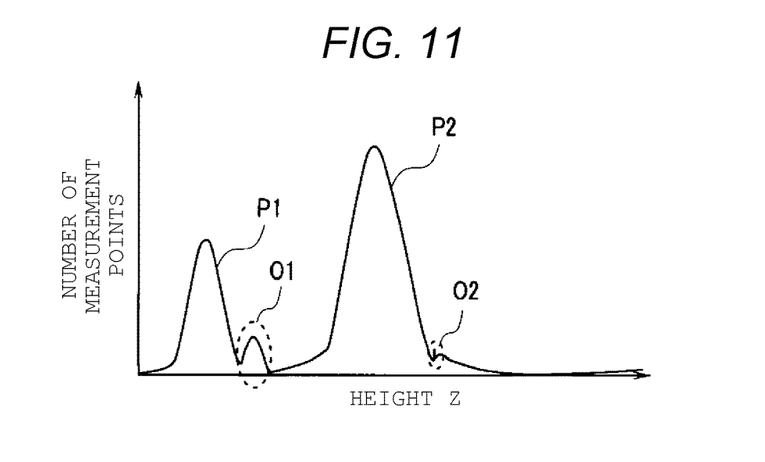
FIG. 11 is a diagram illustrating another example of the level difference histogram.

Further, when there is a minute area having partially (locally) different heights due to corrosion or the like, as illustrated in FIG. 11, for example, a sub-peak O1 having a predetermined distribution appears in an area adjacent to the peak P1 of the pad PD. Since the level difference PS is calculated using only the two peaks P1 and P2, the sub-peak O1 does not affect the value of the level difference PS. That is, according to the method of calculating the level difference in this embodiment, the level difference PS can be easily calculated regardless of the presence or absence of a defect such as corrosion.

It is noted that the sub-peak O1 having a predetermined distribution can be output as an abnormal portion such as a defect. When a plurality of measurement areas MA are set in the measurement target area OA, it is possible to perform in-plane defect management by extracting the measurement area MA in which a defect is detected. Additionally, when set criteria (for example, a difference between the height of the sub-peak O1 and the height of the peak, the number of measurement points present in the sub-peak O1, and a distribution width of the sub-peak O1) are exceeded, setting is executed in advance to recognize the sub-peak O1 as a defect, thereby making it possible to automatically extract the defect in the step of generating the level difference histogram (S31).

Furthermore, as illustrated in FIG. 11, when a linear sub-peak O2 having no distribution appears, it can be regarded as an outlier (abnormal value). The sub-peak O2 can be ignored as a pseudo. Since the level difference PS is calculated using only the two peaks P1 and P2, the sub-peak O2 does not also affect the value of the level difference PS.

In the above description, the level difference histogram is generated by representing the measurement data itself as a histogram. Alternatively, a curve fitting to the measurement data may be derived using a Gaussian function or the like, and the curve may be used instead of the level difference histogram. Furthermore, a relationship between past measurement data and a level difference may be accumulated as learning data, and the level difference may be estimated by comparing the learning data with current measurement data.

Further, in addition to calculating the level difference PS, a height distribution in the pad PD and a height distribution of the passivation film PV can be calculated from the level difference histogram. For example, a half-value width of the first peak P1 appearing on the lower height side can be defined as a height distribution D2 in the pad PD, and a half-value width of the second peak P2 appearing on the higher height side can be defined as a height distribution D1 of the passivation film PV. As described above, by calculating not only the level difference PS but also the height distributions D1 and D2, the shape of the level difference portion can be more finely managed.

Next, a management value (average level difference or the like) in the measurement target area OA is calculated (S33). Specifically, the level differences PS calculated in S32 with respect to all the measurement areas MA in the measurement target area OA are integrated, and an average level difference is calculated by dividing the integrated level differences PS by the number of measurement areas MA. Additionally, a distribution width of the level difference PS in each measurement area MA may be calculated and used as a management value together with the average level difference. Furthermore, together with the average level difference, the level difference PS and the height distributions D1 and D2 of each measurement area MA calculated in S32 may also be used as management values. Finally, with the output of the management value calculated in S3 (S4), a series of procedures of the method of calculating the level difference according to at least one embodiment are terminated.

As described above, according to at least one embodiment, the measurement area MA including the bottom surface and the upper surface of the level difference is set in the measurement target area OA of the specimen 11, and the measurement data in the measurement area MA is histogrammed by the level difference calculation unit 63. A difference between the peak values of the two peaks appearing in the histogram is defined as a level difference, thereby making it possible to eliminate various influences such as an inclination when the specimen 11 is placed on the specimen stage 10, an overall (global) height deviation such as warpage and distortion of the specimen 11, and a defect such as corrosion. That is, it is possible to provide a level difference measuring apparatus and a method of calculating a level difference capable of easily measuring a level difference and reducing measurement variations.

Figure 12:
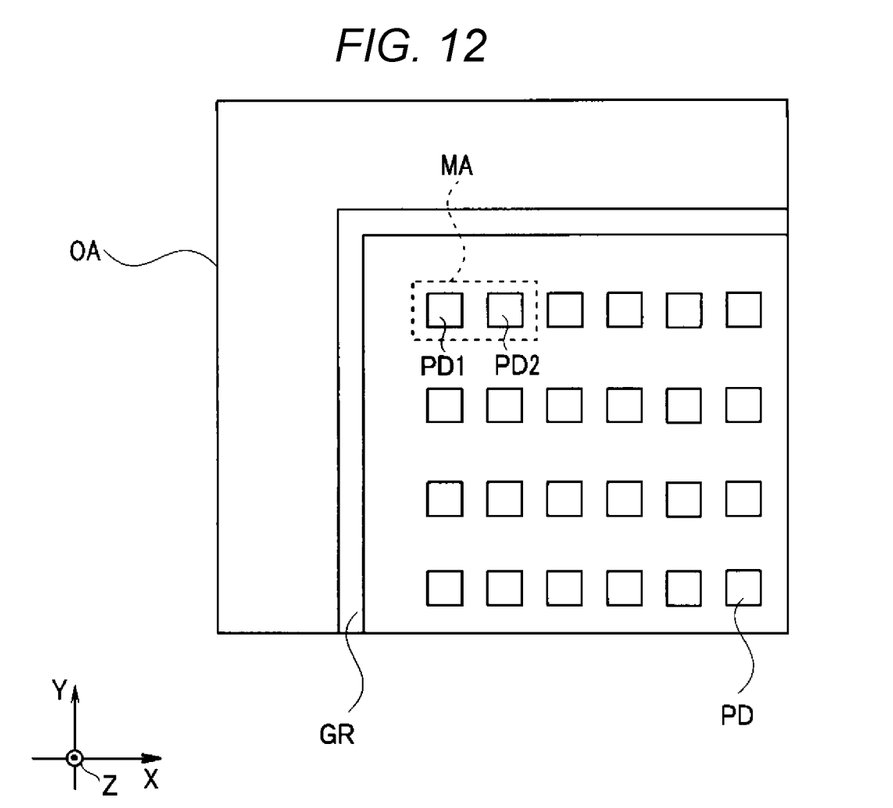
FIG. 12 is a top view illustrating another example of the measurement area.

In the above description, the measurement area MA is set so as to include one pad PD and the passivation film PV located around the one pad PD. Alternatively, the measurement area MA may be set to include a plurality of pads. For example, as illustrated in FIG. 12, the measurement area MA may be set to include two pads PD1 and PD2. FIG. 12 is a top view illustrating another example of the measurement area. However, when the measurement data in the measurement area MA is histogrammed, it is desirable to set the measurement area MA so that a distribution has two peaks including the peak of the pad PD and the peak of the passivation film PV.

Figure 13:
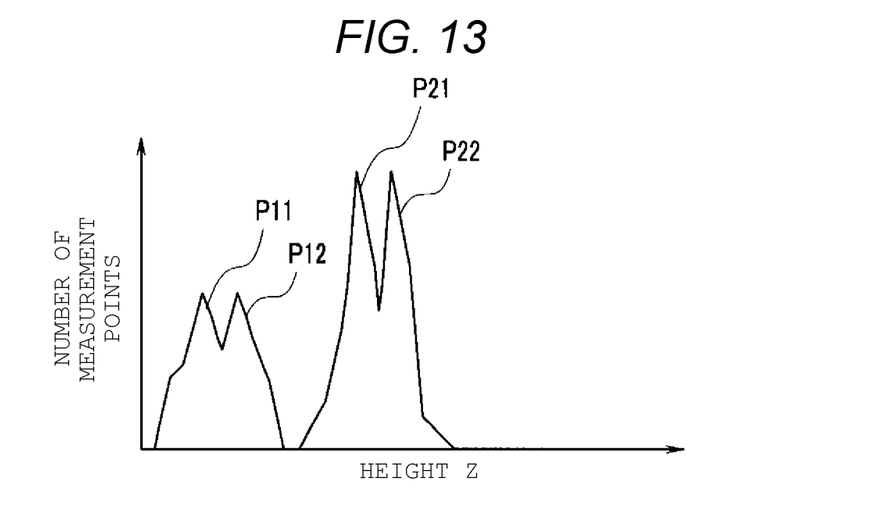
FIG. 13 is a diagram illustrating an example of a level difference histogram of the measurement area illustrated in FIG. 12.

FIG. 13 is a diagram illustrating an example of a level difference histogram of the measurement area illustrated in FIG. 12. For example, in a case where the measurement data of the measurement area MA is histogrammed, when a distribution as illustrated in FIG. 13, that is, four peaks including a peak P11 of the pad PD1, a peak P12 of the pad PD2, a peak P21 of the passivation film PV located around the pad PD1, and a peak P22 of the passivation film PV located around the pad PD2 are generated, the level difference PS cannot be calculated by simple subtraction. When two or more peaks are generated in this way, it is necessary to narrow the measurement area MA and reduce the number of included pads PD. When the distribution has two peaks as illustrated in FIG. 10, the measurement area MA may be set so as to include two or more pads.

Figure 14:
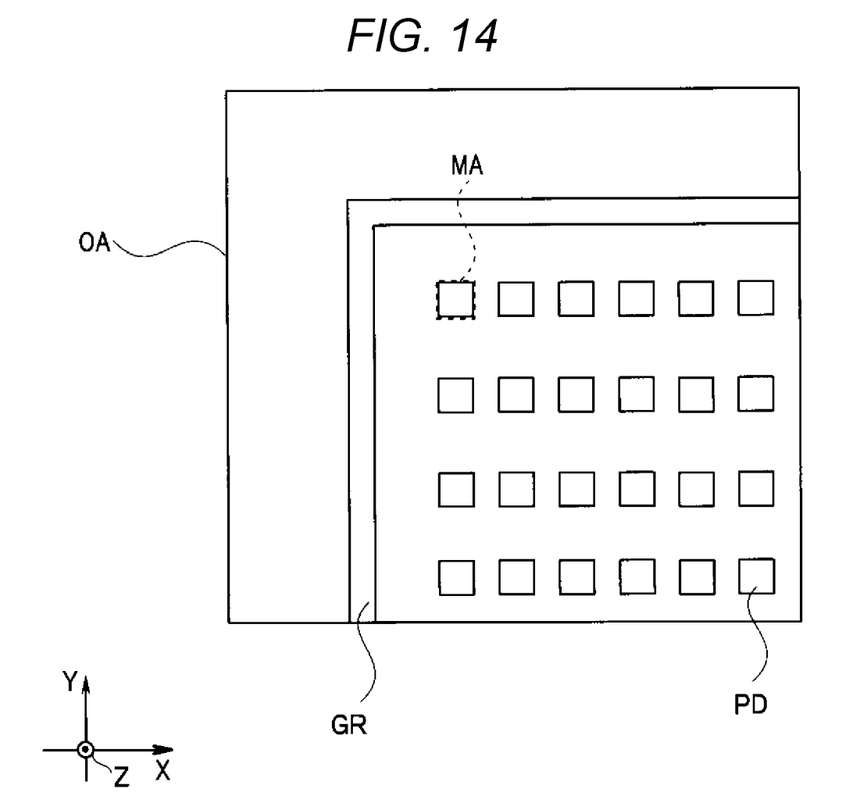
FIG. 14 is a top view illustrating another example of the measurement area.
Figure 15:
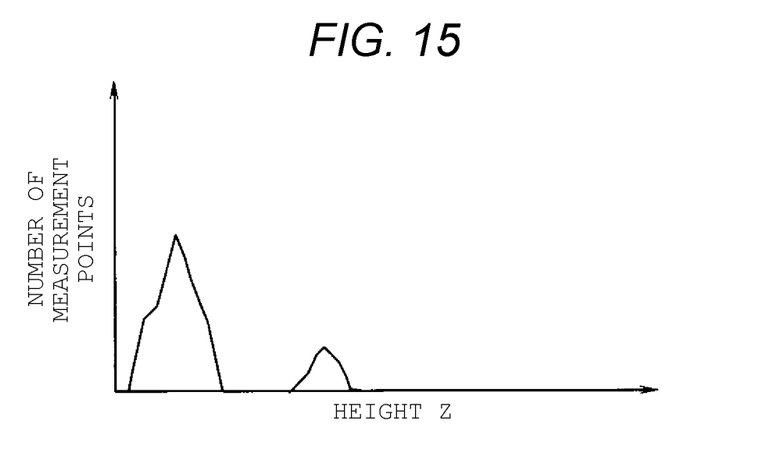
FIG. 15 is a diagram illustrating an example of a level difference histogram of the measurement area illustrated in FIG. 14.

FIG. 14 is a top view illustrating another example of the measurement area. FIG. 15 is a diagram illustrating an example of a level difference histogram of the measurement area illustrated in FIG. 14. The measurement area MA illustrated in FIG. 14 is set to include only one pad PD, but hardly includes the passivation film PV around the pad PD. When the measurement area MA is set in this manner, as illustrated in FIG. 15, the peak of the passivation film PV becomes small, and it becomes difficult to distinguish the peak of the passivation film PV from a sub-peak. Accordingly, it is preferable to monitor and adjust the measurement area MA so that not only the number of included pads PD but also the shape of the level difference histogram is optimized for calculation of the level difference PS.

In addition, an apparatus for measuring the surface shape (height) of the specimen 11 is not limited to an atomic force microscope, but a measurement apparatus using light, an electron beam, an X-ray, or the like may be used depending on the required resolution.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A level difference measuring apparatus configured to measure a level difference on a specimen surface having unevenness, the apparatus comprising:
    a height measurement device configured to measure a surface height of each of a plurality of measurement points on the specimen surface; and
    a level difference calculator configured to calculate the level difference in a measurement target area that includes the plurality of measurement points,
    wherein the level difference calculator is configured to:
        set a measurement area including at least one level difference portion in the measurement target area,
        generate a first histogram based on the surface heights of the measurement points disposed in the measurement area, and
        calculate, based on the first histogram, the level difference of the level difference portion.

2. The level difference measuring apparatus according to claim 1, wherein the level difference calculator is configured to calculate each peak of the first histogram by fitting, and calculate the level difference of the level difference portion based on each peak.

3. The level difference measuring apparatus according to claim 1, wherein the level difference calculator is configured to calculate each peak of the first histogram by comparison with previously accumulated past learning data, and to calculate, based on the peak, the level difference of the level difference portion.

4. The level difference measuring apparatus according to claim 1, wherein the level difference calculator is configured to adjust a range of the measurement area such that multiple peaks appear in the first histogram.

5. The level difference measuring apparatus according to claim 1, wherein the level difference calculator is configured to:
    set a plurality of the measurement areas in the measurement target area,
    calculate a height of the level difference portion disposed in each of the measurement areas,
    generate a second histogram based on the heights calculated in the plurality of measurement areas, and
    calculate, based on the second histogram, an average level difference of the level difference portion in the measurement target area.

6. The level difference measuring apparatus according to claim 1, wherein the height measurement device includes an atomic force microscope.

7. The level difference measuring apparatus according to claim 1, wherein setting the measurement area includes setting a temporary measurement area and adjusting the temporary measurement area.

8. The level difference measuring apparatus according to claim 7, wherein the adjusting the temporary measurement area includes increasing the temporary measurement area.

9. The level difference measuring apparatus according to claim 1, wherein the first histogram has two height distribution peaks.

10. A method of calculating a level difference, the method comprising:
    measuring a surface height of each of a plurality of measurement points set on a surface of a specimen, the surface having unevenness;
    setting a measurement area including at least one level difference portion on the surface of the specimen;
    generating a first histogram based on the surface heights of the measurement points disposed in the measurement area; and
    calculating, based on the first histogram, the level difference of the level difference portion disposed in the measurement area.

11. The method according to claim 10, wherein each peak of the first histogram is calculated by fitting, and the level difference of the level difference portion is calculated based on each peak.

12. The method according to claim 10, wherein each peak of the first histogram is calculated by comparison with previously accumulated past learning data, and the level difference of the level difference portion is calculated based on the peak.

13. The method according to claim 10, further comprising adjusting a range of the measurement area such that multiple peaks appear in the first histogram.

14. The method according to claim 10, further comprising:
    setting a plurality of the measurement areas in the measurement target area;
    calculating a height of the level difference portion disposed in each of the measurement areas;
    generating a second histogram based on the heights calculated in the plurality of measurement areas; and
    calculating, based on the second histogram, an average level difference of the level difference portion in the measurement target area.

* * * * *